US008990076B1

(12) United States Patent
Strom (10) Patent No.: US 8,990,076 B1
(45) Date of Patent: Mar. 24, 2015

(54) FRONT-END DIFFERENCE CODING FOR DISTRIBUTED SPEECH RECOGNITION

(75) Inventor: Nikko Strom, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 375 days.

(21) Appl. No.: 13/608,340

(22) Filed: Sep. 10, 2012

(51) Int. Cl.
*G10L 15/02* (2006.01)
*G10L 15/28* (2013.01)
(52) U.S. Cl.
USPC .......................................... 704/222; 704/236
(58) Field of Classification Search
USPC ........... 704/219, 222, 230–257; 375/240–241
See application file for complete search history.

(56) References Cited

U.S. PATENT DOCUMENTS 5,819,219 A * 10/1998 De Vos et al. ................. 704/238
7,979,277 B2 * 7/2011 Larri et al. .................... 704/238

OTHER PUBLICATIONS

D. Pearce. Enabling New Speech Driven Services for Mobile Devices: An overview of the ETSI standards activities for Distributed Speech Recognition Front-ends. Applied Voice Input/Output Society Conference (AVIOS2000), San Jose, CA, May 2000.
D. Pearce, et al. The Impact of Distributed Speech Recognition on multi-modal interfaces to the Mobile Web. ETSI STQ Aurora DSR Subgroup "DSR Applications & Protocols", Oct. 3, 2012.

* cited by examiner

*Primary Examiner* — Abdul Azad
(74) *Attorney, Agent, or Firm* — Seyfarth Shaw LLP; Ilan N. Barzilay (57) ABSTRACT

In automated speech recognition (ASR), multiple devices may be employed to perform the ASR in a distributed environment. To reduce bandwidth use in transmitting between devices ASR information is compressed prior to transmission. To counteract fidelity loss that may accompany such compression, two versions of an audio signal are processed by an acoustic front end (AFE), one version is unaltered and one is compressed and decompressed prior to AFE processing. The two versions are compared, and the comparison data is sent to a recipient for further ASR processing. The recipient uses the comparison data and a received version of the compressed audio signal to recreate the post-AFE processing results from the received audio signal. The result is improved ASR results and decreased bandwidth usage between distributed ASR devices.

23 Claims, 8 Drawing Sheets

FRONT-END DIFFERENCE CODING FOR DISTRIBUTED SPEECH RECOGNITION

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

In certain automatic speech recognition (ASR) systems, it may be desirable to have different devices perform different ASR computing functions. This may be referred to as distributed ASR. In one example of a distributed ASR system, audio is input into a first device and ASR processing is performed by a second device. Offered is a method and system to efficiently transmit versions of the processed audio signal from a first device to a second device in a manner that may allow post-transmission review of the audio signal by both a machine and human. The present disclosure also offers a system for transmitting multiple versions of the audio signal for ASR purposes while reducing high bandwidth use that may be found in other systems where audio data is transmitted from one device to another.

Figure 1:
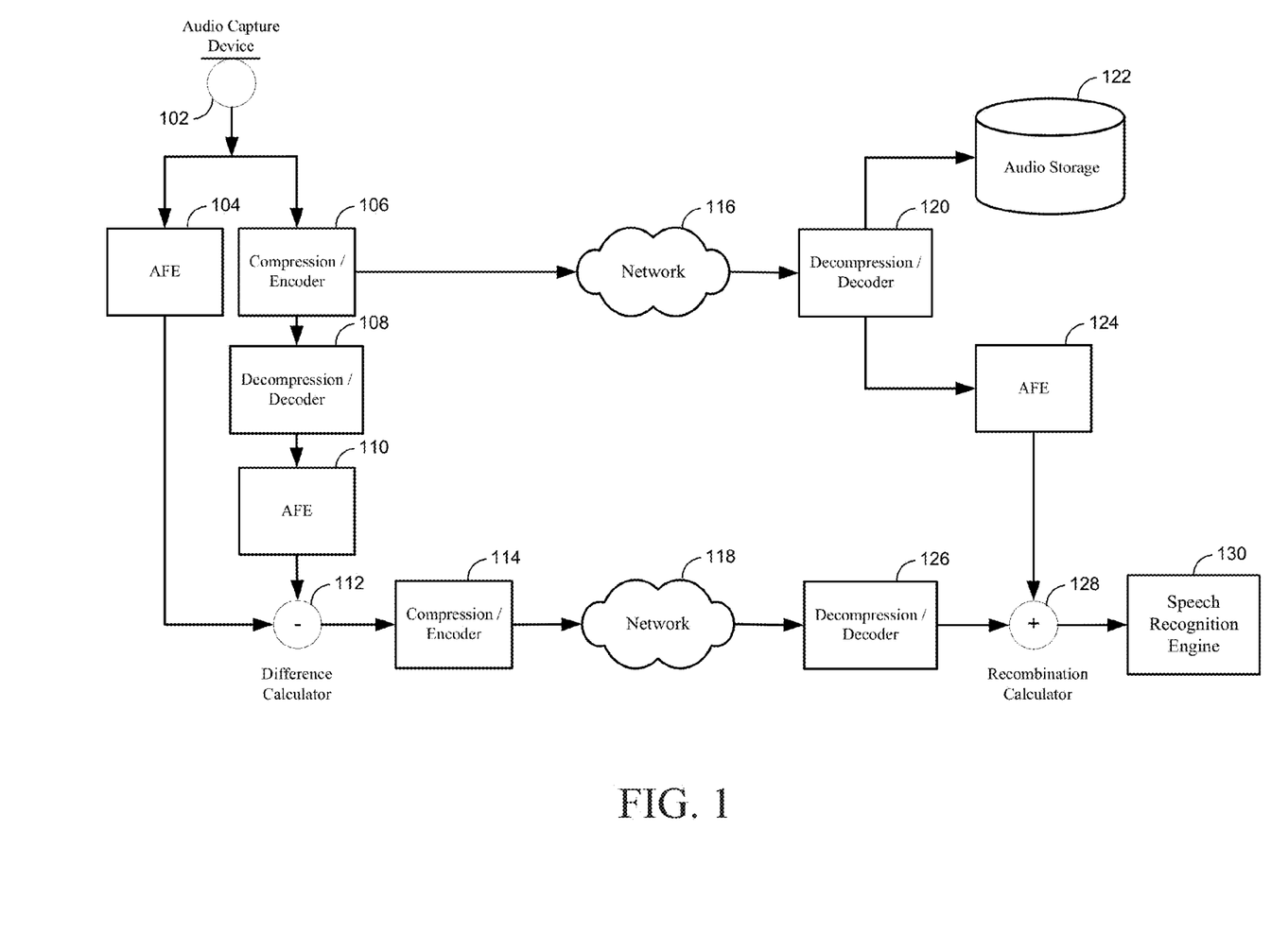
FIG. 1 illustrates a system for distributed speech recognition according to one aspect of the present disclosure according to one aspect of the present disclosure.

In one aspect of the present disclosure, an audio signal may be processed and transmitted in a distributed ASR system multiple ways that account for the effects of signal compression and decompression. Thus, any negative impact of such processing is reduced and network bandwidth for transmission is also reduced. As shown in FIG. 1, and further detailed below, a first (sending) device may compute feature vectors (or other data from an acoustic front end (AFE)) using both the original audio signal as well as a compressed and decompressed version of the audio signal. The first device may then calculate the difference between those feature vector versions, compress the difference, and transmit the compressed difference to the second (receiving) device. The first device also transmits the compressed audio signal to the second device. The second device then reconstructs the post-AFE feature vectors from the difference data and the compressed audio signal. The resulting feature vectors are higher fidelity than feature vectors that would have resulted from processing the compressed audio signal alone.

In this manner a receiving device may perform ASR using data from higher quality feature vectors, while also having access to the audio signal for human review. Aspects of the present disclosure also allow for higher quality ASR results while using lower bandwidth than previous systems and reduce the use of compression/encoders that are specially configured for post AFE data.

Figure 2:
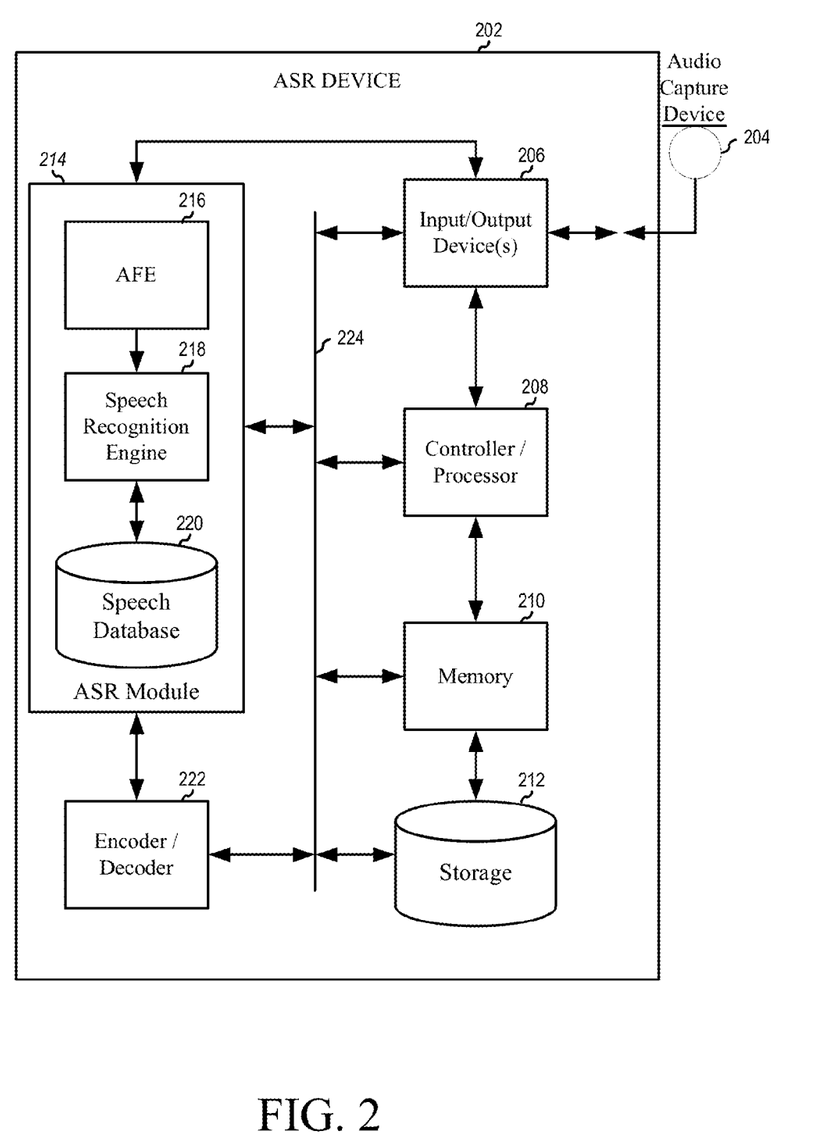
FIG. 2 is a block diagram conceptually illustrating a device for speech recognition according to one aspect of the present disclosure.

FIG. 2 shows an automatic speech recognition (ASR) device 202 for performing speech recognition. Aspects of the present disclosure include computer-readable and computer-executable instructions that may reside on the ASR device 202. FIG. 2 illustrates a number of components that may be included in the ASR device 202, however other non-illustrated components may also be included. Also, some of the illustrated components may not be present in every device capable of employing aspects of the present disclosure. Further, some components that are illustrated in the ASR device 202 as a single component may also appear multiple times in a single device. For example, the ASR device 202 may include multiple input/output devices 206 or multiple controllers/processors 208.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 202 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the ASR device 202 may include an audio capture device 204 for capturing spoken utterances for processing. The audio capture device 204 may include a microphone or other suitable component for capturing sound. The audio capture device 204 may be integrated into the ASR device 202 or may be separate from the ASR device 202. The ASR device 202 may also include an address/data bus 224 for conveying information among components of the ASR device 202. Each component within the ASR device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208).

The ASR device 202 may include a controller/processor 208 that may be a central processing unit (CPU) for processing information and computer-readable instructions and a memory 210 for storing information and instructions. The memory 210 may include volatile random access memory (RAM), non-volatile read only memory (ROM), and/or other types of memory. The ASR device 202 may also include a data storage component 212, for storing information and instructions. The data storage component 212 may include one or more storage types such as magnetic storage, optical storage, solid-state storage, etc. The ASR device 202 may also be connected to removable or external memory and/or storage (such as a removable memory card, memory key drive, networked storage, etc.) through the input/output device 206. Computer instructions for processing by the controller/processor 208 for operating the ASR device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The ASR device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as RF, infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the ASR device 202 may connect to a network, such as the Internet or private network, which may include a distributed computing environment.

The device may also include an ASR module 214 for processing spoken audio data into text. The ASR module 214 transcribes audio information into text information representing the words of the speech contained in the audio information. The text information may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a score representing the likelihood that a particular set of known words matches those spoken in the utterance. The probability may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned probability, the ASR module 214 may output the most likely words recognized in the audio data. The ASR module 214 may also output multiple alternative recognized words in the form of a lattice or an N-best list (described in more detail below).

The ASR module 214 may be connected to the bus 224, input/output device(s) 206, audio capture device 204, encoder/decoder 222, controller/processor 208 and/or other component of the ASR device 202. Audio data sent to the ASR module 214 may come from the audio capture device 204 or may be received by the input/output device 206, such as audio data captured by a remote entity and sent to the ASR device 202 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 204 and input/output device 206 may be configured to adjust the audio data based on traditional tradeoffs of quality versus data size or other considerations.

The ASR module 214 includes an acoustic front end (AFE) 216, a speech recognition engine 218, and speech storage 220. The AFE 216 transforms audio data into data for processing by the speech recognition engine 218. The speech recognition engine 218 compares the speech recognition data with the acoustic, language, and other data models and information stored in the speech storage 220 for recognizing the speech contained in the original audio data. The AFE 216 and speech recognition engine 218 may include their own controller(s)/processor(s) and memory or they may use the controller/processor 208 and memory 210 of the ASR device 202, for example. Similarly, the instructions for operating the AFE 216 and speech recognition engine 218 may be located within the ASR module 214, within the memory 210 and/or storage 212 of the ASR device 202, or within an external device.

Figure 3:
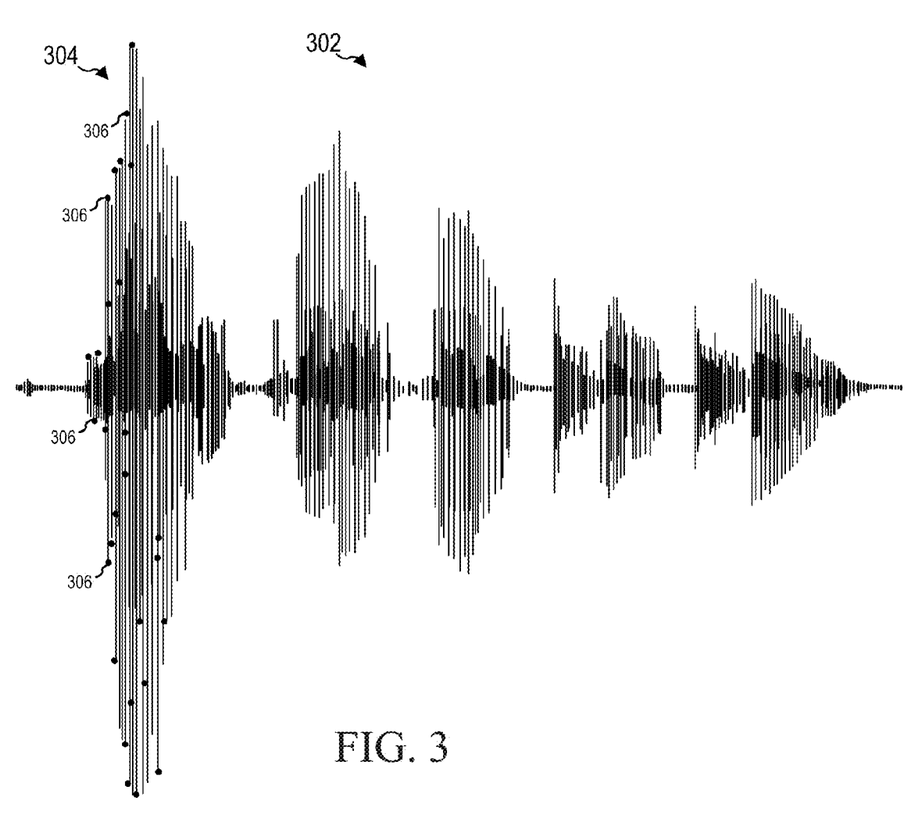
FIG. 3 illustrates an audio waveform processed according to one aspect of the present disclosure.

Received audio data may be sent to the AFE 216 for processing. The AFE 216 may reduce noise in the audio data, identify parts of the audio data containing speech for processing, and segment and process the identified speech components. The AFE 216 may divide the digitized audio data into frames, with each frame representing a time interval, for example 10 milliseconds (ms). During that frame, the AFE 216 determines a set of values, called a feature vector, representing the features/qualities of the utterance portion within the frame. Feature vectors may contain a varying number of values, for example forty. The feature vector may represent different qualities of the audio data within the frame. FIG. 3 shows a digitized audio data waveform 302, with multiple points 306 of the first word 304 as the first word 304 is being processed. The audio qualities of those points may be stored into feature vectors. Feature vectors may be combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 206 for transmission to another device for further processing. The feature vectors may be encoded and/or compressed by the encoder/decoder 222 prior to transmission. The encoder/decoder 222 may be customized for encoding and decoding ASR data, such as digitized audio data, feature vectors, etc. The encoder/decoder 222 may also encode non-ASR data of the ASR device 202, for example using a general encoding scheme such as .zip, etc. The functionality of the encoder/decoder 222 may be located in a separate component, as illustrated in FIG. 2, or may be executed by the controller/processor 208, ASR module 214, or other component, for example.

The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the ASR device 202 through the input/output device(s) 206. Feature vectors may arrive at the ASR device 202 encoded, in which case they may be decoded (for example by the encoder/decoder 222) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 220 may also include a training corpus that may include recorded speech and/or corresponding transcription, that may be used to train the models used by the ASR module 214 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own individual recognition scores. Phonemes in context that are less common may be clustered together to have a group recognition score. By clustering phoneme groups in this manner, fewer models may be included in the training corpus, thus easing ASR processing. The training corpus may include multiple versions of the same utterance from different speakers to provide different utterance comparisons for the ASR module 214. The training corpus may also include correctly recognized utterances as well as incorrectly recognized utterances. These incorrectly recognized utterances may include grammar errors, false recognition errors, noise, or other errors that provide the ASR module 214 with examples of error types and corresponding corrections, for example.

Other information may also be stored in the speech storage 220 for use in speech recognition. The contents of the speech storage 220 may be prepared for general ASR use or may be customized to include sounds and words that are likely to be used in a particular application. For example, for ASR processing at an ATM, the speech storage 220 may include customized data specific to banking transactions. In certain instances the speech storage 220 may be customized for an individual user based on his/her individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to language phonemes and words as known in the speech storage 220. The speech recognition engine 218 computes probabilities for the feature vectors based on acoustic information and language information. The acoustic information is used to calculate an acoustic probability representing a likelihood that the intended sound represented by a group of feature vectors match a language phoneme. The language information is used to adjust the acoustic probability by considering what sounds and/or words are used in context with each other, thereby improving the likelihood that the ASR module outputs speech results that make sense grammatically.

Following ASR processing, the ASR results may be sent by the ASR module 214 to another component of the ASR device 202, such as the controller/processor 208 for further processing (such as execution of a command included in the interpreted text) or to the input/output device 206 for sending to an external device.

Figure 4:
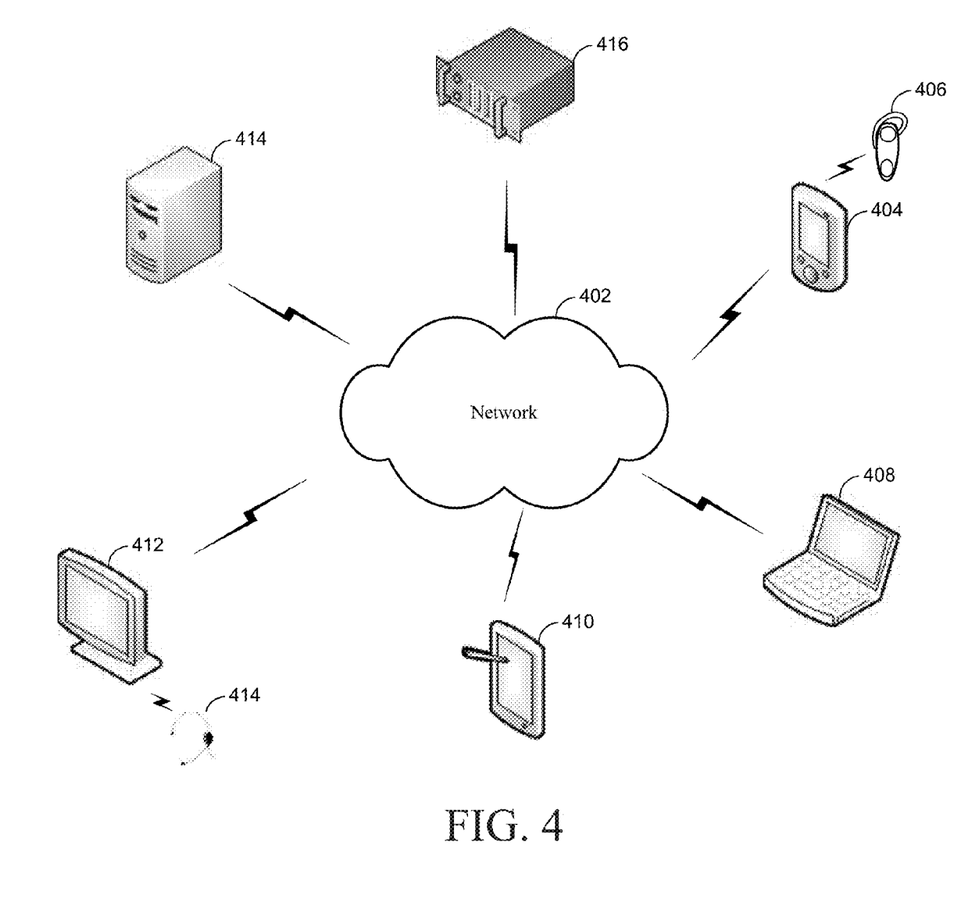
FIG. 4 illustrates a computer network for use with distributed speech recognition according to one aspect of the present disclosure.

Multiple ASR devices 202 may be connected over a network. As shown in FIG. 4 multiple devices may be connected over network 402. Network 402 may include a local or private network or may include a wide network such as the internet. Devices may be connected to the network 402 through either wired or wireless connections. For example, a wireless device 404 may be connected to the network 402 through a wireless service provider. Other devices, such as computer 412, may connect to the network 402 through a wired connection. Other devices, such as laptop 408 or tablet computer 410 may be capable of connection to the network 402 using various connection methods including through a wireless service provider, over a WiFi connection, or the like. Networked devices may input spoken audio through a number of audio input devices including through headsets 406 or 414. Audio input devices may be connected to networked devices either through a wired or wireless connection. Networked devices may also include embedded audio input devices, such as an internal microphone (not pictured) in laptop 408, wireless device 404 or table computer 410.

In certain ASR system configurations, one device may capture an audio signal and another device may perform the ASR processing. For example, audio input to the headset 414 may be captured by computer 412 and sent over the network 402 to computer 414 or server 416 for processing. Or computer 412 may partially process the audio signal before sending it over the network 402. Because ASR processing may involve significant computational resources, in terms of both storage and processing power, such split configurations may be employed where the device capturing the audio has lower processing capabilities than a remote device and higher quality ASR results are desired. The audio capture may occur near a user and the captured audio signal sent to another device for processing.

Figure 5:
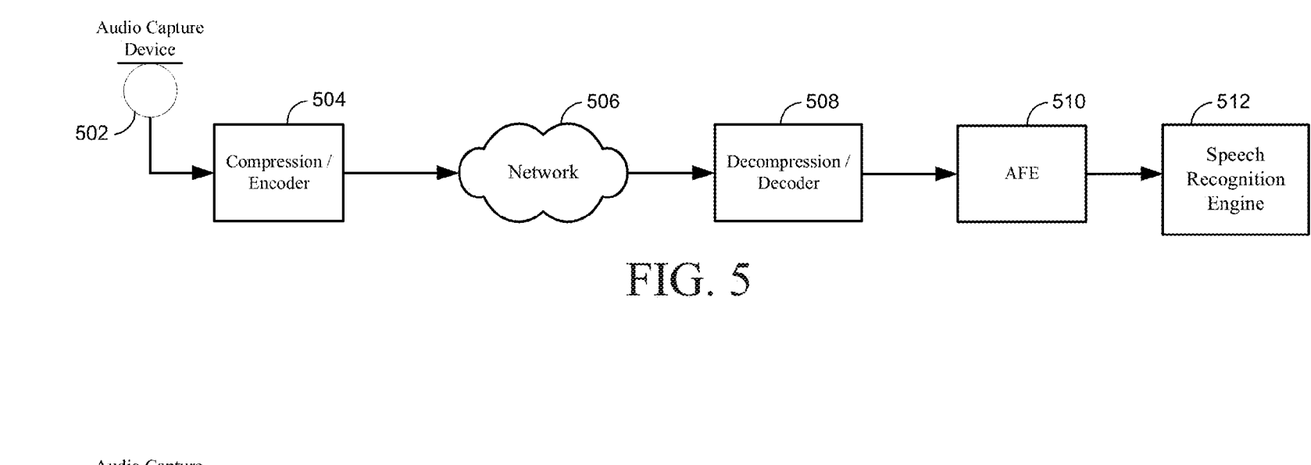
FIG. 5 illustrates a system for distributed speech recognition according to one aspect of the present disclosure.

An example of one such configuration is shown in FIG. 5. In this configuration a first (transmitting) device includes an audio capture device 502 and a compression/encoder 504. A second (receiving) device includes a decompression/decoder 508, acoustic front end (AFE) 510 and speech recognition engine 512, which may be similar to the speech recognition engine 218. The two devices may be examples of ASR devices 202 with different component configurations, or may be other devices. The two devices are connected over a network 506. The audio is captured by the audio capture device 502 to generate audio data, such as a signal. Because audio data may be large, the captured audio data may be compressed by a compression/encoder 504, which may be an encoder/decoder 222, prior to transmission over the network 506. Once received by the second device, the compressed audio is decompressed by the decompression/decoder 508, which may be an encoder/decoder 222. The decompressed audio data is then processed by the AFE 510 and passed to the speech recognition engine 512, for example, in the form of feature vectors. The speech recognition engine 512 then completes the ASR processing with assistance of a speech recognition database (not pictured).

A number of compression/encoding techniques methods may be used to perform compression as described in the present disclosure. Such techniques may include lossy techniques, lossless techniques, Lempel-Ziv techniques, code-excited linear prediction (CELP), etc. Other suitable techniques may also be used.

Compression methods, such as those employed by the compression/encoder 504, typically involve some loss of signal quality resulting in a degradation of the audio signal. This degradation in audio signal may lead to a corresponding increase in recognition errors during ASR processing and a resulting degradation in ASR quality over what would have been possible by performing ASR processing with uncompressed audio.

Figure 6:
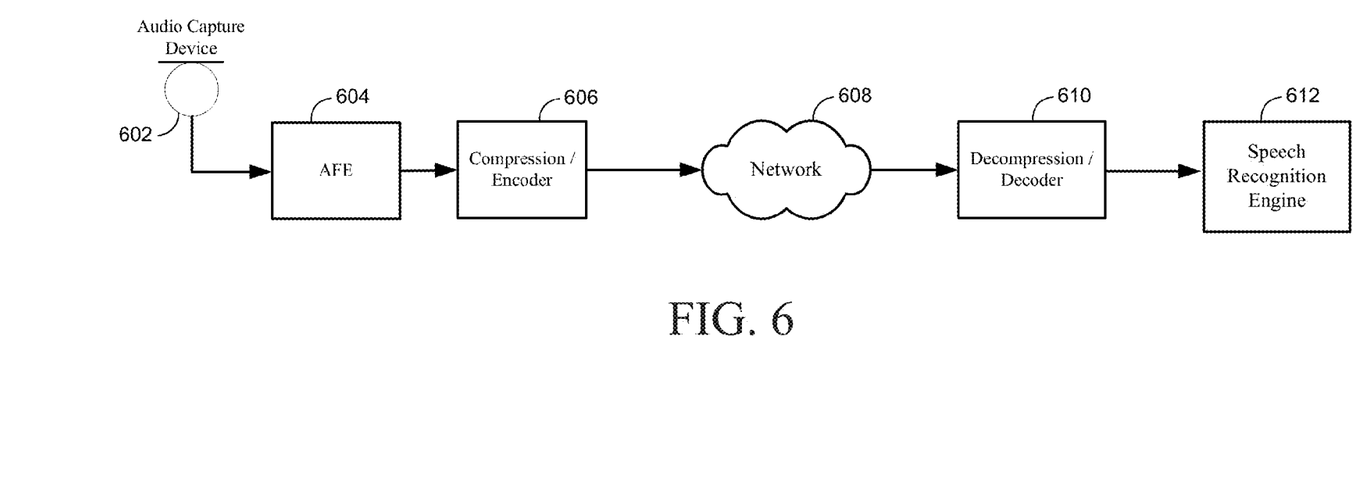
FIG. 6 illustrates a system for distributed speech recognition according to one aspect of the present disclosure.

To improve ASR performance, a distributed ASR may be configured differently, with the AFE processing moved to the first device and thus performed prior to compression. An example of one such configuration is shown in FIG. 6. In the configuration shown in FIG. 6 the first device includes an audio capture device 602, an AFE 604 and a compression/encoder 606. The second device includes a decompression/decoder 610 and speech recognition engine 612, which may be similar to the speech recognition engine 218. The two devices are connected over a network 608. The audio is captured by the audio capture device 602 to generate audio data, such as a signal. The AFE 604 then converts the captured audio data, for example, into feature vectors (or other ASR formatted data) as described above. Because the feature vector data are also large, they may be compressed by the compression/encoder 606, which may be an encoder/decoder 222, prior to transmission over the network 606. Once received by the second device, the compressed feature vectors are decompressed by the decompression/decoder 610, which may be an encoder/decoder 222. The decompressed feature vectors may then be passed to the speech recognition engine 612, which completes the ASR processing with assistance of a speech recognition database (not pictured).

Because compression in FIG. 6 occurs after processing by the AFE 604, the compression technique employed by the compression/encoder 606 may be specifically configured for post-AFE data. Because use of such special purpose compression techniques may lead to less degradation in the overall ASR accuracy, distributed ASR systems configured in the manner of FIG. 6 may see improved results over systems configured in the manner of FIG. 5, depending on the configured tradeoff between accuracy and bandwidth.

One drawback, however, of systems configured in the manner of FIG. 6, is that the captured audio signal is not available for further processing. The captured audio signal may be desired for further applications or further processing. For example, the captured audio signal could be transcribed by a human, could be processed to identify characteristics of the speaker (such as gender or the identity of the speaker), could be used to perform speaker adaptation (such as maximum a posteriori adaptation or constrained maximum likelihood linear regression adaptation), could be used in ASR training (such as adapting an acoustic model or other model), or could be processed with a different AFE.

Compressed feature vectors may be insufficient to reconstruct the audio signal with sufficient fidelity for the reconstructed audio to be useful to other applications (such as speaker identification, speech recognition training, etc.). As a result, a different configuration where audio data of a sufficient quality is available at the receiving side may be desired. If such higher quality audio data is desired at the receiving end of a distributed ASR system, a configuration such as that shown in FIG. 7 may be employed.

Figure 7:
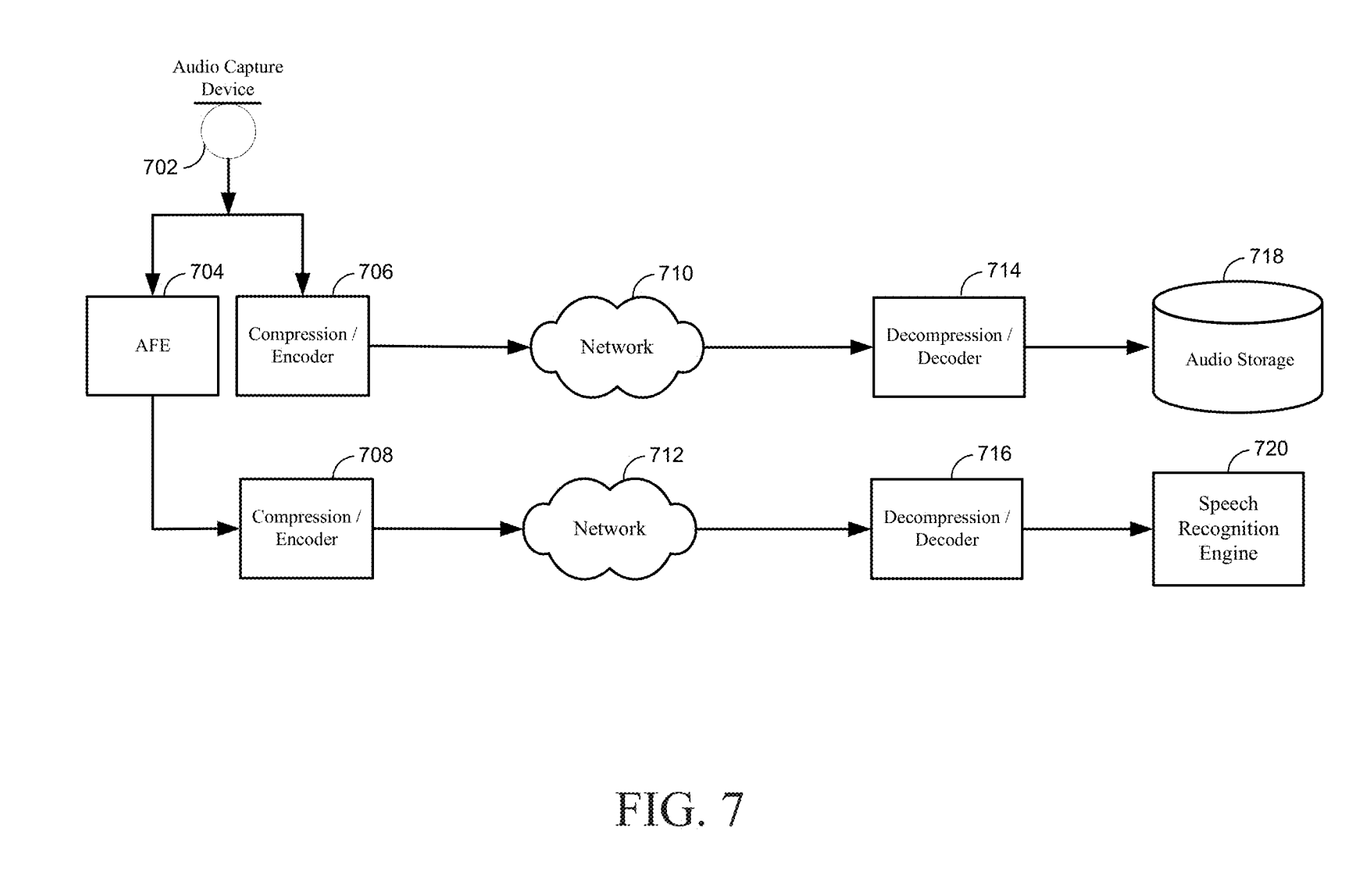
FIG. 7 illustrates a system for distributed speech recognition according to one aspect of the present disclosure.

In FIG. 7, the compressed audio signal may be sent along with the compressed feature vectors, allowing the second device to perform ASR error correction, quality review, and the like. In the sample configuration shown in FIG. 7, the first device includes an audio capture device 702, an AFE 704 and a compression/encoder 706. The second device includes a decompression/decoder 714, a decompression/decoder 716, audio storage 718 and speech recognition engine 720, which may be similar to the speech recognition engine 218. The two devices are connected over a network 710, 712. Although illustrated as two different networks, network 710 and network 712 may be different networks or the same network.

As can be seen in FIG. 7, the configuration of FIG. 7 is a combination of certain aspects of the configurations of FIG. 5 and FIG. 6 allowing transmission of both the compressed audio signal and compressed feature vectors from the first device to the second device. The audio is captured by the audio capture device 702 to generate audio data, such as a signal. In the first processing chain of FIG. 7, the audio data is compressed by a compression/encoder 706, which may be an encoder/decoder 222, prior to transmission over the network 710. The compression/encoder 706 may employ a general compression technique, or may be configured for compression of the audio signal, such as an encoder employing a CELP compression technique. Once received by the second device, the compressed audio is decompressed by the decompression/decoder 714, which may be an encoder/decoder 222. The decompression/decoder 714 uses a decompression technique that is compatible with the compression technique employed by the compression/encoder 706. The resulting decompressed audio may then be stored in an audio storage component 718 for further processing or operation, such as use in ASR error correction.

In the second processing chain of FIG. 7, the AFE 704 converts the captured audio signal into feature vectors (or other ASR formatted data) as described above. As the feature vector data may be large, they may be compressed by the compression/encoder 708, which may be an encoder/decoder 222, prior to transmission over the network 712. Once received by the second device, the compressed feature vectors may be decompressed by the decompression/decoder 716, which may be an encoder/decoder 222. The decompressed feature vectors may then be passed to the speech recognition engine 720, which may complete the ASR processing with assistance of a speech recognition database (not pictured). As discussed for the compression techniques of FIG. 6, the compression employed by the compression/encoder 708 may be specially configured for compressing post-AFE data, such as feature vectors. The decompression/decoder 716 uses a decompression technique that is compatible with the compression technique employed by the compression/encoder 708.

The system of FIG. 7 sends a compressed version of the audio signal (sent across network 710) and another version of the audio signal, processed with an AFE and compressed for processing by the ASR (sent across network 712). One drawback to this approach is that the system of FIG. 7 uses significant bandwidth due to the double transmission. Sending the audio signal and feature vectors in parallel is not an efficient use of bandwidth due to the overlap in information included in both kinds of data.

To reduce the consumed bandwidth, but still allow the transmission of data to perform ASR along with captured audio signal, the system configuration of FIG. 1 is offered. In the system of FIG. 1, a first (sending) device may compute feature vectors (or other post-AFE data) using both the original audio signal as well as using the compressed and decompressed (and thus degraded) audio signal. The first device may then calculate the difference between those feature vector versions, compress the difference, and transmit the compressed difference to the second (receiving) device. The second device may then reconstruct the post-AFE feature vectors by using the difference data and the compressed audio signal.

Thus, the configuration of FIG. 1 allows for higher quality ASR results. At the same time the configuration of FIG. 1 may consume less bandwidth than other configurations as the compressed difference typically uses less bandwidth to transmit than transmission of compressed feature vectors. The quality of the ASR results may depend on the compression techniques used. Lossless techniques may achieve higher fidelity but with a larger use of bandwidth. Lossy techniques may use less bandwidth but may result in lower quality results.

As illustrated in FIG. 1, at a first device, audio is captured by the audio capture device 102 to generate audio data, such as a signal. The audio data may be compressed by a compression/encoder 106, which may be an encoder/decoder 222. The compression/encoder 106 may employ a general compression technique or may be configured for compression of audio data, such as an encoder employing a CELP compression technique. The results of the compression are sent in two directions. In the first direction, the compressed audio signal is transmitted over the network 116 to another device (further discussed below). In the second direction, the compressed audio signal is sent to a decompression/decoder 108. After having been compressed and then decompressed, the audio signal is now reformulated to represent an audio signal that may be received after network transmission such as when the audio signal is compressed before being transmitted by a sending device and decompressed after being received by a receiving device. The reformulated audio signal is then sent to AFE 110 for preliminary ASR processing into feature vectors.

In addition to the above processing, the original audio signal (that is, the audio signal that has not been compressed and decompressed) is sent from the audio capture device 102 to AFE 104. AFE 104 converts the audio signal into feature vectors for ASR processing. A difference calculator 112 then calculates a difference between the feature vectors created from the original audio signal and the feature vectors calculated from the reformulated audio signal. This difference may be referred to as difference data, comparison data, or as a feature vector difference. With the difference data, another device could recreate the clean audio signal feature vectors from the reformulated audio signal feature vectors and the compressed audio signal. The difference data may then be compressed by compression/encoder 114, which may be an encoder/decoder 222, and sent over the network 118 to another device. The compression technique used by compression/encoder 114 may be a general compression technique or may be specially configured to compress difference data. In one aspect of the present disclosure, the compression technique employed by compression/encoder 114 is a lossy compression technique. In another aspect, the compression technique employed by compression/encoder 114 is a lossless compression technique. Although illustrated as two different networks, network 116 and network 118 may be different networks or the same network. In addition, although the device(s) receiving the information sent across networks 116 and 118 is illustrated as a single device, one or more devices may be used.

After being received, the compressed difference data is decompressed by decompression/decoder 126. Similarly, after being received, the compressed audio signal is decompressed by decompression/decoder 120. The reformulated audio signal is then stored in audio storage 122 for later use, which may include ASR error correction, or may include any further application. Comparison of the reformulated audio signal may be performed by a human or by a receiving device. The decompressed audio signal may also be sent to AFE 124 for creation of feature vectors based on the reformulated audio signal.

In one aspect of the present disclosure, the AFEs of FIG. 1 are configured to operate using similar AFE techniques. Thus, AFEs 104, 110, and 124 perform operations whose results are compatible. Similarly, compression/encoder and decompression/decoder pairs are configured to operate using similar compression/decompression techniques. Thus, compression/encoder 106 and decompression/decoders 108 and 120 perform operations on audio data whose results are compatible. Compression/encoder 114 and decompression/decoder 126 perform operations on difference data whose results are compatible.

In one aspect of the present disclosure, based in part on the compression/decompression techniques employed and the quality of network transmission, the reformulated audio data created by decompression/decoder 120 matches the reformulated audio signal created by decompression/decoder 108. That is, if lossless compression techniques are used, transmission of the compressed audio signal occurs without error, and the decompression/decoder 120 performs the same decompression as decompression/decoder 108, the output of decompression/decoder 120 may match the output of decompression/decoder 108. Similarly, in one aspect the feature vectors created by AFE 110 may match the feature vectors created by AFE 124. Also, in one aspect the difference data calculated by the difference calculator 112 may match the difference data decompressed by the decompression/decoder 126.

The feature vectors, based on the reformulated audio signal, created by AFE 124 and the decompressed difference data created by decompression/decoder 126 may be combined in the recombination calculator 128. In one aspect, if the compression technique employed by the compression/encoder 114 is a lossless technique (and no data was lost in transmission over the network 118), and the output of AFE 110 matches the output of AFE 124, the feature vectors output by the recombination calculator 128 may match the feature vectors created by AFE 104. These feature vectors represent feature vectors created from uncompressed (and therefore higher fidelity) audio data. These higher fidelity feature vectors may then be processed by the speech recognition engine 130, which may complete the ASR processing with assistance of a speech recognition database (not pictured). If the compression/encoder 114 employs a lossy compression technique, or if there is other fidelity loss in the system, the feature vectors output by the recombination calculator 128 may not exactly match the feature vectors created by AFE 104, but they may still result in higher fidelity feature vectors than might have otherwise been available from the reformulated audio signal alone.

In one aspect, the configuration of FIG. 1 does not involve use of compression/encoders which are specially configured for compression of front-end features. This is because, as illustrated in FIG. 1, only the audio signal and difference data may be compressed and ultimately transmitted over the network. Between the audio signal and the ASR processing, some data is sent between a sending device(s) and a receiving device(s). The specific data that is sent, and how it is sent, may be configured based on multiple factors such as available communication bandwidth, desired quality level of ASR results, the ability to correct errors, etc. For example, the compression/encoders shown in FIG. 1 may be adjusted to reach a desired level of compression as compared with potential signal fidelity loss, thus balancing the trade-off between signal quality and bandwidth. In one aspect of the present disclosure, sufficient bandwidth may be available such that compression of the difference data may not be performed or that a lossless compression technique may be used.

Like the system of FIG. 7, the system of FIG. 1 allows for both ASR completion and the availability of the reconstructed audio signal at the receiving end. The configuration of FIG. 1, however, allows for ASR processing based on higher fidelity feature vectors and reduces use of bandwidth on duplicate audio information. Give the same bandwidth, the configuration of FIG. 1 may provide higher quality ASR results than the configuration of FIG. 7. In the system of FIG. 1 applications on the receiving end may make use of the reconstructed audio signal. For example, the captured audio signal could be transcribed by a human, could be processed to identify characteristics of the speaker (such as gender or the identity of the speaker), could be used to perform speaker adaptation (such as maximum a posteriori adaptation or constrained maximum likelihood linear regression adaptation), could be used in ASR training (such as adapting an acoustic model or other model), could be processed with a different AFE, or could otherwise be used by an application.

Figure 8:
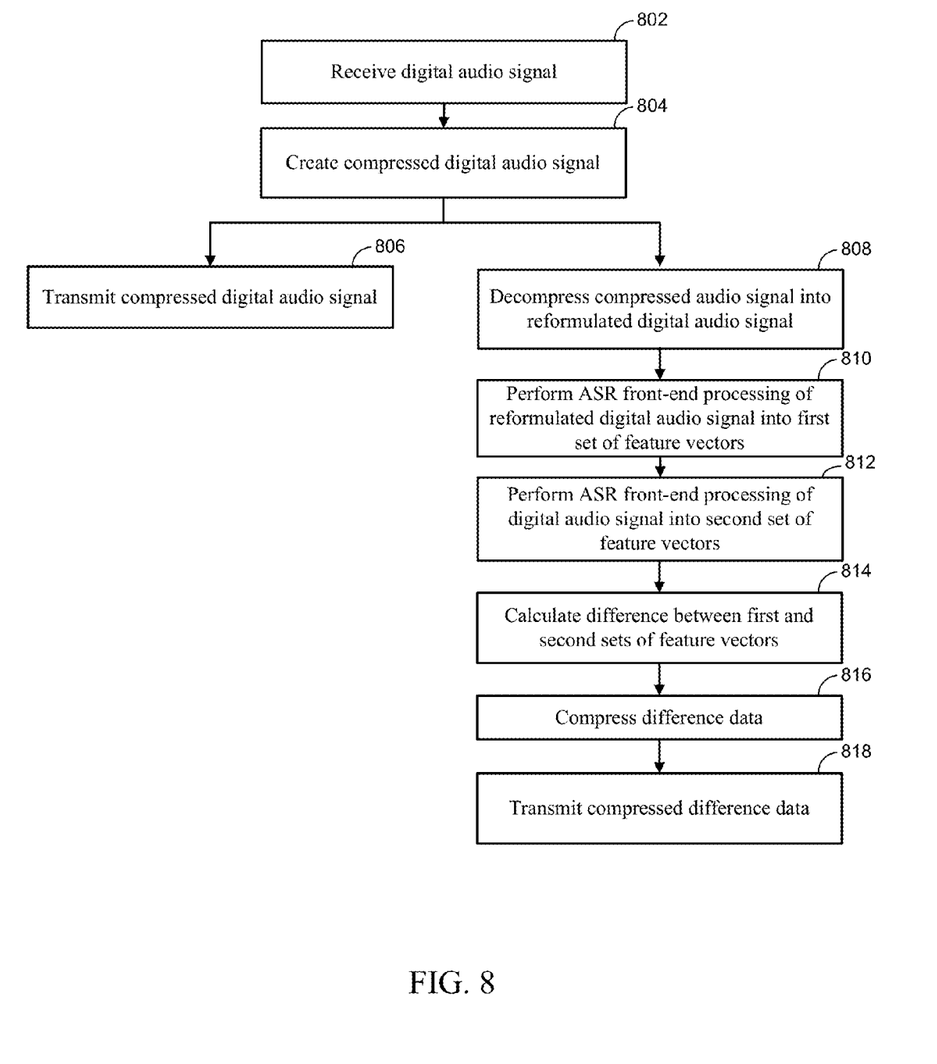
FIG. 8 is a flow diagram illustrating distributed speech recognition according to one aspect of the present disclosure.

As shown in FIG. 8, a device, such as the sending device of FIG. 1, may receive a digital audio signal, as shown in block 802. The device then may create a compressed digital audio signal, as shown in block 804. The device may transmit the compressed digital audio signal to another device, as shown in block 806. The device also may decompress the compressed digital audio signal to create a reformulated digital audio signal, as shown in block 808. The device may perform ASR front-end processing of the reformulated digital audio signal into a first set of feature vectors, as shown in block 810. The device may also perform ASR front-end processing of the original digital audio signal into a second set of feature vectors, as shown in block 812. The device may calculate the difference between the first set of feature vectors and the second set of feature vectors, as shown in block 814. The device may compress the difference data, as shown in block 816. The device may then transmit the compressed difference data, as shown in block 818.

Figure 9:
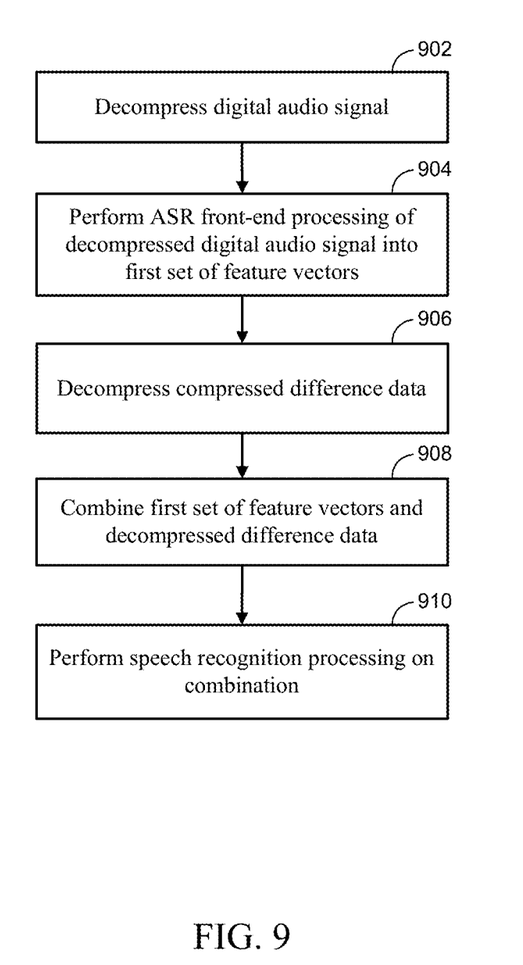
FIG. 9 is a flow diagram illustrating distributed speech recognition according to one aspect of the present disclosure.

As shown in FIG. 9, a device, such as the receiving device of FIG. 1, may decompress the compressed digital audio signal, as shown in block 902. The device may perform ASR front-end processing on the decompressed digital audio signal into a first set of feature vectors, as shown in block 904. The device may decompress difference data, as shown in block 906. The device may combine the first set of feature vectors and the decompressed difference data, as shown in block 908. The device may then perform speech recognition processing on the result of the combination, as shown in block 910.

Although the examples of FIG. 1 and FIGS. 6-9 discuss a sending device and a receiving device, more than two devices may be included, with various components distributed among several different devices and the devices connected over a network or through other techniques. The illustrated devices may be examples of ASR device 202 or may be other devices.

Further, while the examples above are discussed with reference to an ASR system, the teachings of the present disclosure may be applicable to other data processing systems as well. Any data processing system where certain kinds of processed data are to be transmitted along with the unprocessed data, a system of the kind illustrated in FIG. 1 may be desired. For example, the teachings of the present disclosure may apply to image processing systems, facial recognition systems, voice recognition systems (where the identity of a speaker is determined), video recognition systems, and the like. The teachings of the present disclosure may assist in preparing any input data for further processing (which may be referred to as a signal), by preparing comparison data for the signal based on the signal and a reformulated (i.e., compressed and decompressed) version of the signal. The comparison data (or a compressed version thereof) may be sent along with the signal itself (or a compressed version thereof) for remote processing of the comparison data and the signal. In this manner the above teachings for ASR may be generalized for other applications.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A system for distributed processing of audio data for speech recognition, comprising:
 a client device configured to:
  receive a digital signal comprising data representing speech,
  compress the digital signal to create a compressed digital signal,
  decompress the compressed digital signal to create a decompressed digital signal,
  process the decompressed digital signal to create a first set of feature vectors,
  process the digital signal to create a second set of feature vectors,
  calculate a difference between the first set of feature vectors and the second set of feature vectors to create a feature vector difference,
  compress the feature vector difference, and
  transmit the compressed feature vector difference and compressed digital signal to a recipient device; and
 a server device configured to:
  receive the compressed feature vector difference and compressed digital signal,
  decompress the compressed digital signal to create a second decompressed digital signal,
  decompress the compressed feature vector difference to create a decompressed feature vector difference,
  process the second decompressed digital signal to create a third set of feature vectors,
  combine the third set of feature vectors and the decompressed feature vector difference to create a fourth set of feature vectors, and
  perform speech recognition processing on the fourth set of feature vectors.

2. The system of claim 1, wherein the client device is configured to process the digital signal or the decompressed digital signal using at least one of a mel-frequency cepstral coefficients (MFCCs) technique, perceptual linear predictive (PLP) technique, or neural network feature vector technique.

3. The system of claim 1, wherein the client device is configured to compress the digital signal using a code-excited linear prediction (CELP) technique.

4. The system of claim 1, wherein the client device is configured to compress the feature vector difference using a lossless compression technique.

5. A method, comprising:
 receiving a signal comprising data representing speech;
 processing a signal to create first processed data, the first processed data comprising a first processed representation of the speech;
 compressing the signal;
 decompressing the compressed signal to create a decompressed signal;
 processing the decompressed signal to create second processed data, the second processed data comprising a second processed representation of the speech;
 calculating third processed data using the first processed data and the second processed data, wherein the third processed data represents a difference between the first processed data and the second processed data;
 compressing the third processed data; and
 transmitting the compressed signal and compressed third processed data.

6. The method of claim 5, wherein compressing the signal comprises using a lossy compression technique.

7. The method of claim 6, wherein compressing the signal comprises using a code-excited linear prediction (CELP) technique.

8. The method of claim 5, wherein the first processed data comprises a set of feature vectors.

9. The method of claim 5, wherein compressing the third processed data comprises using a lossless compression technique.

10. The method of claim 5, wherein the signal further comprises image data.

11. A non-transitory computer-readable storage medium storing processor-executable instructions for controlling a computing device, comprising:
 program code to receive a signal comprising data representing speech;
 program code to process a signal to create first processed data, the first processed data comprising a first processed representation of the speech;
 program code to compress the signal;
 program code to decompress the compressed signal to create a decompressed signal;
 program code to process the decompressed signal to create second processed data, the second processed data comprising a second processed representation of the speech;
 program code to calculate third processed data using the first processed data and the second processed data, wherein the third processed data represents a difference between the first processed data and the second processed data;
 program code to compress the third processed data; and
 program code to transmit the compressed signal and compressed third processed data.

12. The non-transitory computer-readable storage medium of claim 11, wherein the program code to compress the signal comprises program code to use a lossy compression technique.

13. The non-transitory computer-readable storage medium of claim 12, wherein the program code to compress the signal comprises program code to use a code-excited linear prediction (CELP) technique.

14. The non-transitory computer-readable storage medium of claim 11, wherein the first processed data comprises a set of feature vectors.

15. The non-transitory computer-readable storage medium of claim 11, wherein the program code to compress the third processed data comprises program code to use a lossless compression technique.

16. The non-transitory computer-readable storage medium of claim 11, wherein the signal further comprises image data.

17. A computing device, comprising:
 at least one processor;
 a memory device including instructions operable to be executed by the at least one processor to perform a set of actions, configuring the at least one processor to:
  receive a compressed audio signal;
  decompress the compressed audio signal;
  process the decompressed audio signal to create a first set of feature vectors;
  receive compressed feature vector difference data;
  decompress the compressed feature vector difference data;

combine the first set of feature vectors and the decompressed feature vector difference data to create a second set of feature vectors; and perform speech recognition processing on the second set of feature vectors.

18. The computing device of claim 17, wherein the at least one processor is further configured to decompress a compressed audio signal using a lossy compression technique.

19. The computing device of claim 17, wherein the at least one processor is further configured to perform at least one of storing the decompressed audio signal, identifying a characteristic of a speaker using the decompressed audio signal, adapting an acoustic model using the decompressed audio signal, or processing the decompressed audio signal to create a third set of feature vectors.

20. The computing device of claim 17, wherein the at least one processor is further configured to perform speaker adaptation using the decompressed audio signal and using a maximum a posteriori adaptation technique or a constrained maximum likelihood linear regression adaptation technique.

21. A method comprising:
receiving a compressed signal comprising data representing speech;
receiving compressed feature vector difference data;
decompressing the compressed signal to create a decompressed signal;
processing the decompressed signal to create first processed data comprising feature vectors;
decompressing the compressed feature vector difference data to create second processed data;
combining the first processed data and the second processed data to create third processed data; and
performing speech recognition processing on the third processed data.

22. The method of claim 21, wherein decompressing the compressed feature vector difference data comprises using a lossless compression technique.

23. The method of claim 21, wherein the compressed signal further comprises image data.

* * * * *